United States Patent
Grason et al.

[15] 3,673,328
[45] June 27, 1972

[54] RATE OF AMPLITUDE CHANGE CONTROL FOR AUDIOMETERS OF THE VON BEKESY TYPE

[72] Inventors: Rufus L. Grason, Lincoln; Joseph Mihaly, Sudbury, both of Mass.

[73] Assignee: Grason-Stadler Company, Inc., West Concord, Mass.

[22] Filed: Feb. 26, 1971

[21] Appl. No.: 119,290

[52] U.S. Cl. .............................................. 179/1 N, 318/595
[51] Int. Cl. ..................................................... H04r 29/00
[58] Field of Search .................. 179/1 N; 181/0.5 G; 318/595

[56] References Cited

UNITED STATES PATENTS 2,719,940  10/1955  West ........................................ 318/595
2,605,355  7/1952  Foster ...................................... 179/1 N

*Primary Examiner*—Kathleen H. Claffy
*Assistant Examiner*—Douglas W. Olms
*Attorney*—Kenway, Jenny & Hildreth

[57] ABSTRACT

The rate of amplitude change control disclosed herein is adapted for use in an audiometer of the von Bekesy type in which the subject being tested controls the sense or direction of variation in test-tone amplitude, the amplitude level around which the subject hunts at each test-tone frequency being an accurate indication of the threshold of the subject's hearing at that frequency. The control of the present invention causes the rate of change of amplitude to itself vary from a relatively high rate to a relatively low rate as a test sequence progresses. In this way, a substantial amplitude range can be scanned in a short period until the subject's threshold is first reached and then a slower rate enables the final hunting procedure to proceed gradually and therefore relatively accurately.

10 Claims, 3 Drawing Figures

Patented June 27, 1972

| STATE | 1 | 2 | 4 | 4 | AZ | RATE |
|---|---|---|---|---|---|---|
| INITIAL | 0 | 0 | 0 | 1 | 0 | 10 db./SEC |
| SECOND | 1 | 0 | 0 | 1 | 1 | 5 db./SEC |
| THIRD | 0 | 1 | 0 | 1 | 1 | 5 db./SEC |
| FOURTH | 1 | 1 | 0 | 1 | 1 | 5 db./SEC |
| FIFTH | 0 | 0 | 1 | 0 | 1 | 2.5 db./SEC |

INVENTOR
RUFUS L. GRASON
JOSEPH MIHALY
BY
Kenway, Jenney & Hildreth
ATTORNEYS 3,673,328

RATE OF AMPLITUDE CHANGE CONTROL FOR AUDIOMETERS OF THE VON BEKESY TYPE

BACKGROUND OF THE INVENTION

This invention relates to audiometers of the von Bekesy type and more particularly, to such an audiometer in which the rate of amplitude change is varied within a test sequence.

Heretofore, in audiometers of the von Bekesy type in which the subject being tested controls the sense of variation of test tone amplitude, the rate of amplitude change was typically constant within each test sequence though the rate of amplitude change might be adjustable under the control of the operator of the instrument. The selection of a particular rate of amplitude change was therefore a compromise between speed of testing and accuracy. If too low a rate of change were selected, the initial approach to the subject's hearing threshold would be excessively long. On the other hand, if too high a rate of amplitude change were employed, the subject's response time would adversely affect the accuracy of the ultimate measurement of hearing threshold.

Among the several objects of the present invention may be noted the provision of an audiometer of the von Bekesy type in which the rate of amplitude change is varied from a relatively high rate to a relatively low rate within each test sequence; the provision of such an audiometer which permits relatively rapid testing; the provision of such an audiometer which provides an accurate measurement of hearing acuity; the provision of such an audiometer which is relatively simple to operate, which is highly reliable and which is of relatively simple and inexpensive construction. Other objects and features will be in part apparent and in part pointed out hereinafter.

SUMMARY OF THE INVENTION

Briefly, the present invention relates to an audiometer of the von Bekesy type in which the subject being tested controls the direction or sense of variation of test-tone amplitude. The audiometer employs an amplitude rate of change control having means for generating a signal indicating changes in the sense of amplitude variation. A counter is provided which responds to this signal. The counter is set to a first state at the start of the test sequence and then increments through a succession of predetermined states as the sense of amplitude variation is cyclically reversed. Means are also provided for varying the amplitude of the test-tone at an adjustable rate, the rate being set at a first predetermined value when the counter is in its first state and at a second predetermined value when the counter is in subsequent preselected ones of the succession of states.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
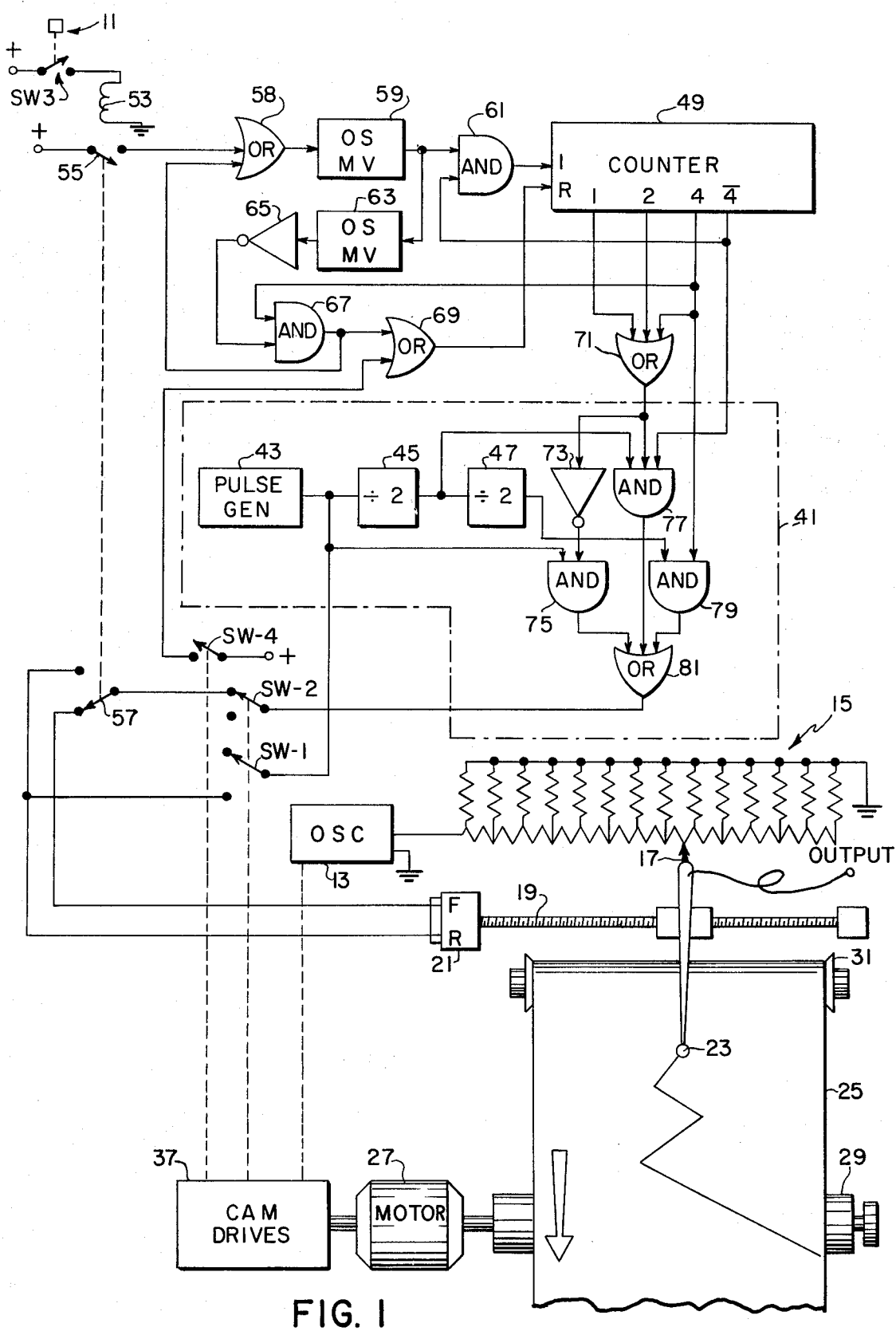
FIG. 1 is a logic diagram of an amplitude rate of change control according to the present invention shown in conjunction with an audiometer of the von Bekesy type which is illustrated in somewhat diagrammatic form.

As indicated previously, the operation of an audiometer of a von Bekesy type is arranged so that the subject being tested controls the direction or sense of variation in test-tone amplitude. This is typically accomplished by providing the subject with a pushbutton and instructing him to press the button when the tone is heard and to release the button when no tone is heard. Such a button is indicated at 11 in FIG. 1. The variation in test-tone amplitude is typically accomplished by means of an attenuator which is interposed between the earphone or other transducer through which the subject hears the test-tone and an oscillator which generates the test-tone. In FIG. 1, such an oscillator is indicated at 13 and operates to apply a signal to a conventional ladder attenuator 15, the attenuator tap being indicated at 17.

In the apparatus illustrated, the position of the tap 17 is controlled by a lead screw 19 which is in turn driven by a reversible stepping motor 21. In order to provide a record of the variation in amplitude during each test sequence, the tap 17 also carries a pen 23 adapted to record on chart paper 25. A timing motor 27 rotates a chart-drive roller 29 at a constant speed so that the chart paper 25 is drawn at a steady rate from a supply roll, indicated at 31. Thus, the record made by the pen 23 is a representation of the test tone amplitude as a function of time.

While an essentially conventional chart drive may be used, as in the illustrated embodiment, it should be understood that other means of recording the test results may also be used such as an X-Y recorder or other storage medium.

In operation, each of a series of test frequencies is provided for a suitable period, e.g. about 30 seconds. For the purpose of this description, the period of application of each test frequency may be considered to be an individual test sequence. However, it should be understood that the present invention may also be applied in test systems in which the test frequency is varied gradually but continuously, rather than stepwise.

At the end of each test sequence at a particular frequency, the attenuator is automatically reset to provide a relatively low output level, e.g. well below a normal test subject's hearing threshold, and then the oscillator is adjusted to provide a new test frequency, thereby initiating a subsequent test sequence.

The sequence of timed operations which form a complete test operation may conveniently be controlled by the timing motor 27. In the illustrative example, motor 27 is shown as operating a set of cam drives 37. One of the cam drives is coupled to the oscillator 13 while another controls a pair of switch contacts SW1 and SW2 which, as is described in greater detail hereinafter, control the resetting of the attenuator. A third cam drive operates a switch SW4 in a timed sequence for purposes explained hereinafter. While cams driven by motor 27 control the succession of test sequences in the embodiment illustrated, other means may also be used. For example, if an X-Y recorder were used, the drive operating along the frequency axis could also operate a mechanical switch or commutator which selects the appropriate frequency for each particular point along the axis.

The stepping motor 21 is selectively actuated by electrical pulses provided by a programmable pulse source, indicated generally at 41. Pulse source 41 includes a pulse generator 43 and two divide-by-two circuits 45 and 47 which are driven in cascade by the pulse generator 43. Three pulse rates are thus available which differ by powers of two. The absolute values of these rates are selected in relation to the characteristics of the stepping motor 21 and its gearing so as to produce, through the attenuator, rates of amplitude variation which are appropriate for a Bekesy type attenuator. In the example illustrated, it may be assumed that the three pulse rates correspond to amplitude variation rates of 10 decibels per second, 5 decibels per second, and 2.5 decibels per second. As is also explained hereinafter, the particular speed which is applied at any given moment within a given test sequence depends upon the number of responses which the test subject has made thus far.

The subject's responses are counted by means of a three-bit binary counter, designated 49. As noted previously, the test subject responds by pressing the button 11 to indicate that the test tone amplitude has risen to a perceptible level. The pushbutton 11 actuates a switch SW3 which in turn energizes a relay winding 53. Relay winding 53 controls two sets of contacts 55 and 57. The contacts 57 are employed in reversing the direction or sense of amplitude variation, as described hereinafter. The contacts 55, on the other hand, generate a signal which is employed to indicate the occurrence of such changes in the sense of amplitude variation.

The signal provided by the contacts 55 is applied, through an OR gate 58, to a one-shot multivibrator circuit 59. As is understood by those skilled in the art, the operation of such a multivibrator circuit is to generate an output pulse having a substantially predetermined duration each time the circuit is triggered, the length of the output pulse being substantially independent of the duration of the triggering signal. This multivibrator circuit 59 provides a relatively short pulse, e.g., 20 milliseconds, suitable for actuating the binary counter 49 and is triggered by the trailing or negative-going edge of the triggering signal applied thereto.

The output pulses provided by multivibrator 59 are applied to the input of the counter 49 through an AND gate 61. In the embodiment illustrated, the counter 49 is of the type which increments on the trailing or negative-going edge of a squarewave pulse signal applied to its input terminal. In the counter 49, output signals are obtained from each of the three stages, the "true" signals for the three successive stages being designated 1, 2 and 4 respectively. The last stage also provides an inverted or complemented signal, designated $\overline{4}$. The counter 49 may selectively be set to an initial or first state, the state in which the 1, 2 and 4 signals are all "zero," by the application of a pulse signal to the reset terminal of the counter, designated R. As with the input signal being counted, the reset signal is effective on its trailing or negative-going edge.

The $\overline{4}$ signal is applied as the other input signal to the AND gate 61. Thus, as will be understood by those skilled in the art, the pulse signals generated by the multivibrator 59 will get through to the input of the counter 49 only as long as the counter is in one of the first four of its eight possible binary states.

The output signal from the one-shot multivibrator circuit 59 is also applied to a second one-shot multivibrator circuit 63. Again, this second multivibrator is triggered by the trailing or negative-going transition of the input signal applied thereto. Further, the characteristics of multivibrator 63 are such that its timing period is re-initiated if it is triggered during a previously initiated timing period. The parameters of multivibrator 63 are selected so that it produces a relatively long output pulse, e.g., about 5 seconds in the embodiment illustrated. This output signal is inverted, as indicated at 65, and the inverted signal is combined with the 4 output signal from the counter 49 in an AND gate 67. The output signal from AND gate 67 is in turn applied to the reset terminal of counter 49 through an OR gate 69. A second input signal is provided to the OR gate 69 by a set of switch contacts SW4 which, as noted previously, are operated by the timing or sequencing cam drives 37.

As noted previously, the counter 49 is employed in selecting which of the various pulse frequencies produced by the source 41 are applied to the stepping motor 21 which drives the attenuator. For this purpose, the 1, 2 and 4 signals are combined in an OR gate 71 to provide an output signal which may be conveniently designated the all-zero or AZ signal. The AZ, 4 and $\overline{4}$ signals are provided to the pulse-source 41.

The AZ signal is complemented, as indicated at 73, and the complemented signal is combined, in an AND gate 75, with the highest frequency pulse signal. The uncomplemented AZ signal and the $\overline{4}$ signal are combined, in an AND gate 77, with the intermediate frequency pulse signal obtained from the frequency divider 45. Similarly, the 4 signal and the lowest frequency pulse signal, obtained from the frequency divider 47, are combined in an AND gate 79. The output signals from the three AND gates 75, 77 and 79 are in turn combined in an OR gate 81.

As will be readily understood by those skilled in the digital logic arts, the AND gates 75, 77 and 79 operate to pass only a selected one of the three pulse frequency signals in dependence upon the pattern of the input signals (AZ, 4 and $\overline{4}$) applied to the pulse source 41. The OR gate 81 then passes whichever one of the signals was so selected.

From the particular combination of signals used, it can be seen that: the highest pulse frequency is provided only when the counter is in its all-zero state; the intermediate frequency pulse signal will be provided when the counter is in the next three states and the lowest frequency pulse signal will be provided after the counter reaches its fifth state. As was noted previously, the combination of the $\overline{4}$ signal with the pulse signal from multivibrator 59 in the AND gate 61 causes the counter 49 to stop counting once it reaches its fifth state.

The selected pulse signal is passed, through the switch SW2 and the relay contacts 57, to either the forward or the reverse drive winding of the stepping motor 21. Thus, assuming that the switch SW2 is closed, as shown, the stepping motor will be driven in its forward or reverse directions at the selected speed. Since the contacts 57 are controlled by the pushbutton 11 operating through the relay winding 53, the direction or sense of change is under the control of the test subject.

The highest frequency pulse signal, direct from the pulse generator 43, is provided to the switch SW1. It can thus be seen that when the ganged switches SW1 and SW2 are moved to positions opposite those shown by the operation of the sequencing cam drives, the stepping motor will be driven at its fastest speed in the reverse direction. As indicated previously, this operation is provided in conventional manner to return the attenuator to a low output level position, prior to beginning each test sequence.

Figures 2, 3:
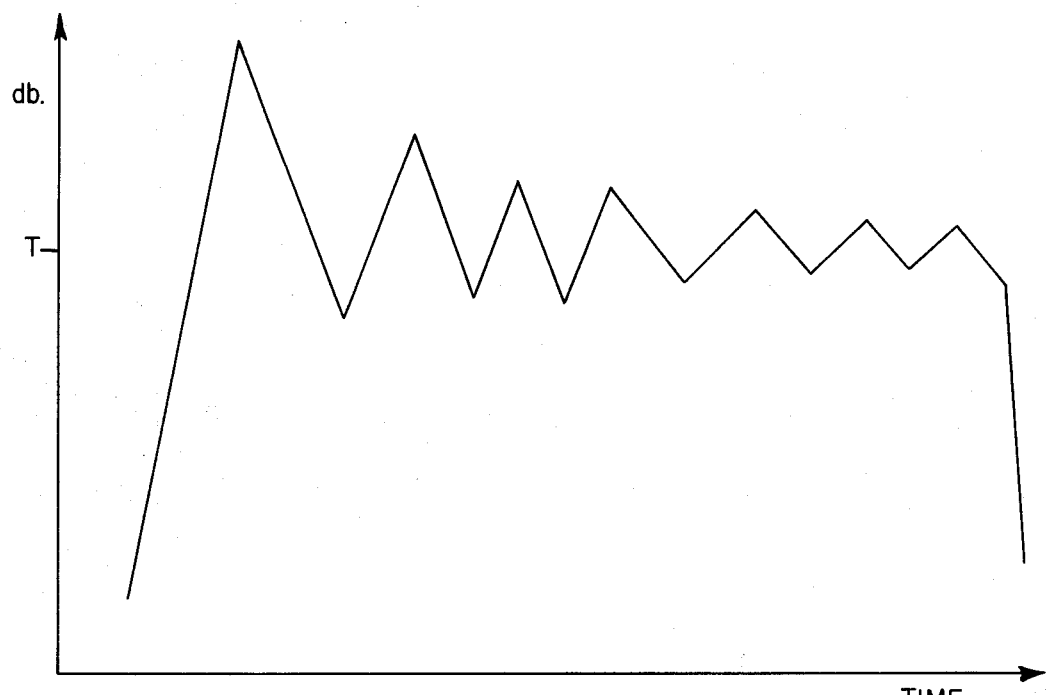
FIG. 2 is a graph representing the behavior of the audiometer attenuator setting during a typical test sequence, the audiometer setting being under the control of the test subject.
FIG. 3 is a chart representing the sequence of various binary signals occurring in apparatus of FIG. 1.

The operation of this apparatus is substantially as follows, reference being had to FIGS. 2 and 3. At the start of a test sequence, it is assumed that: the counter 49 has been reset to its "all zero" state; the switches SW1-SW4 are in the positions shown in FIG. 1; and the attenuator tap 17 has been set to provide a low level test tone amplitude. With the counter 49 in its first or "all zero" state, the highest pulse frequency available from the source 41 is applied, through the switch SW2 and the relay contacts 57 to the forward winding of the stepping motor 21. Accordingly, the attenuator tap 17 will move steadily and at a relatively rapid rate in a direction increasing the amplitude of the test tone being applied to the test subject. As illustrated, this movement of the tap would be to the left of FIG. 1. The amplitude of the test tone will thus increase at a relatively rapid rate, e.g., 10 decibels per second at the illustrative embodiment. This is indicated in FIG. 2 by the relatively steep initial slope of the graph. When the output amplitude reaches the subject's hearing threshold, he operates the pushbutton 11. However, since the amplitude rate of change is relatively high in this initial scan, there will typically be considerable overshoot as indicated in FIG. 2.

When the button 11 is pushed, the direction or sense of amplitude variation is reversed through the operation of the contacts 57. Simultaneously, the contacts 55 generate a signal which triggers the multivibrator 59 to generate an output signal which increments the counter 49 to its first state. The presence of a "true" or "high" logic level at the 1's output terminal of the counter 49 causes the highest pulse-rate signal to be cut off at the gate 75. Simultaneously, however, the AND gate 77 is enabled, so that the intermediate pulse frequency is supplied in its place. Thus, as the attenuator tap 17 moves in the reverse direction, the rate of change of test tone amplitude will be at the intermediate value, i.e., 5 decibels per second in the illustrated embodiment. When the output amplitude again drops below the subject's hearing threshold, at the respective frequency, he will release the button 11 and, due to the operation of the contacts 57 the direction or sense of output amplitude variation will again reverse, i.e., the amplitude will increase. For the next two subject response cycles the apparatus will then function in conventional manner for a von Bekesy type audiometer. This is, the attenuator setting will hunt at the 5 decibel per second rate of amplitude change. However, on each response cycle, the counter 49 will be incremented by one state. Upon the subject's fourth response, the $\overline{4}$ signal will cause the AND gate 77 to block the intermediate frequency pulse signal while the 4 signal will enable the AND gate 79 allowing the lowest frequency pulse signal to pass. Thus, on subsequent response cycles the rate of amplitude change will be at the lowest value, i.e., 2.5 decibels per second in the illustrated embodiment. As will be understood by those skilled in the art, this relatively slow rate of amplitude change will typically permit a relatively accurate determination of the threshold of hearing since the overshoot on each side of the threshold will be minimized by the relatively slow rate of change.

The mode of operation thus far described assumes that a proper hunting of attenuator level around the subject's hearing threshold has been established by the time the audiometer shifts into its lowest rate of amplitude change. However, the apparatus also includes means for speeding up the amplitude scan if the subject has somehow allowed the attenuator setting to deviate far from his threshold during the slow scan. As described previously, the one-shot multivibrator 63 restarts is timing period each time it is triggered by an output pulse from the other one-shot multivibrator circuit 59. After four responses, i.e. after the counter 49 has reached its fifth state, the AND gate 67 which controls the output signal from the second multivibrator 63 is in effect enabled by the 4 output signal from the counter 49. Thus, if the one-shot multivibrator 63 reaches the end of its timing interval in the period between any two successive responses, subsequent to the fourth response in the test sequence, the negative-going transition passed by the AND gate 67 will cause the counter 49 to be reset to its initial or "all zero" state. The output signal from AND gate 67 is also applied, through the AND gate 58, to the first one-shot multivibrator 59 so that the counter is immediately incremented to its second state, that is, the next state after the first or "all zero" state. Accordingly, if the separation of any two successive responses is greater than 5 seconds while the audiometer is operating in its 2.5 decibel per second amplitude scan mode, the counter will essentially immediately be returned to its second state so that the scanning procedure is returned to the intermediate or 5 decibel per second rate of amplitude change. This reversion to a higher rate of amplitude change is also highly advantageous when the frequency is changed gradually rather than stepwise. In such a case the test sequence may be relatively long and comprise a range of frequencies. If the subject's hearing threshold drops off sharply, it is desirable to speed up the rate of amplitude scan if there is a significant interval since the last response, so as to minimize deviation of the recorded level from the actual subject threshold.

Since the rate of amplitude change control of this invention provides a relatively high initial rate of scan together with a subsequent slower rate of scan, it can be seen that this apparatus is both capable of providing a relatively rapid test sequence while also producing a relatively accurate measurement of hearing threshold.

While the embodiment illustrated in effect considers each subject response to comprise a full cycle, i.e. two reversals of the direction or sense of amplitude change, it should be understood that each reversal might itself be considered to be a response and that the counter could be incremented upon each such response. In such a case the number of counter states employed would be correspondingly expanded. Similarly, while a single frequency test tone has been described it should be understood that test tones comprising multiple frequencies or white noise may also be employed.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In an audiometer of the von Bekesy type, in which the subject being tested controls the sense of variation of testtone amplitude, an amplitude rate-of-change control comprising:

means for providing a signal indicating changes in the sense of amplitude variation;

a counter responsive to said signal, said counter incrementing through a succession of predetermined states as the sense of amplitude variation is cyclically reversed;

means for setting said counter to a first state at the start of a test sequence;

means for varying the amplitude of said test tone at an adjustable rate; and means for setting said rate of amplitude variation at a first predetermined value when said counter is in said first state and for setting said rate at a second predetermined value when said counter is in subsequent ones of said succession of states.

2. In an audiometer of the von Bekesy type, in which the subject being tested controls the sense of variation of testtone amplitude, an amplitude rate-of-change control comprising:

means for providing a signal indicating changes in the sense of amplitude variation;

a counter responsive to said signal;

means for setting said counter to a first state at the start of a test sequence, said counter incrementing through a succession of predetermined states as the sense of amplitude variation is cyclically reversed from said first state, through a plurality of intermediate states, to a last state;

means for varying the amplitude of said test tone at a preselectable rate; and means for setting said rate of amplitude variation at a first, relatively high predetermined value when said counter is in said first state, for setting said rate at a second, intermediate predetermined value when said counter is in one of said intermediate states, and for setting said rate at a third, relatively high rate when said counter is in said last state.

3. A rate-of-change control as set forth in claim 2 including means, operative when said counter is in said last state, for returning said counter to a predetermined one of said intermediate states if the sense of amplitude variation is not reversed within a predetermined time interval.

4. A rate-of-change control as set forth in claim 3 wherein said first value is about 10 decibels per second, said intermediate value is about 5 decibels per second and said third value is about 2 and ½ decibels per second.

5. A rate-of-change control as set forth in claim 4 wherein said predetermined time interval is about 5 seconds.

6. An audiometer as set forth in claim 2 including means for changing the test-tone frequency between successive test sequences.

7. In an audiometer of the von Besesy type, in which the subject being tested controls the sense of variation of testtone amplitude, an amplitude rate-of-change control comprising:

means for providing a signal indicating changes in the sense of amplitude variation;

means for varying the amplitude of said test tone at a selected one of at least two different predetermined rates; and switching means, operative when said amplitude varying means is functioning at a lower of said rates and responsive to said sense change signal, for changing to a higher of said rates if the sense of variation is not reversed within a preselected time interval.

8. An audiometer as set forth in claim 7 including means for progressively changing the test-tone frequency.

9. An audiometer as set forth in claim 8 wherein said frequency is changed stepwise.

10. In an audiometer of the von Bekesy type, in which the subject being tested controls the sense of variation of test-tone amplitude, an amplitude rate-of-change control comprising:

means for providing a signal indicating changes in the sense of amplitude variation;

means for varying the amplitude of said test tone at a selected one of at least two different predetermined rates; and switching means, operative when said amplitude varying means is functioning at a higher one of said rates and responsive to said sense change signal, for changing to a lower one of said rates when the sense of amplitude variation is reversed.

* * * * *